(12) United States Patent
Newman

(10) Patent No.: US 6,817,180 B2
(45) Date of Patent: Nov. 16, 2004

(54) GRAVITY AS A SOURCE OF RENEWABLE ENERGY

(76) Inventor: Edwin Newman, 10331 Lindley Ave. #113, Northridge, CA (US) 91326

( * ) Notice: Subject to any disclaimer, the term of this patent is extended or adjusted under 35 U.S.C. 154(b) by 0 days.

(21) Appl. No.: 10/379,235

(22) Filed: Mar. 6, 2003

(65) Prior Publication Data

US 2004/0172944 A1 Sep. 9, 2004

(51) Int. Cl.$^7$ .............................. F03G 3/04; F03B 7/00
(52) U.S. Cl. .............................. 60/639; 60/495; 415/5; 415/7; 415/916; 417/329
(58) Field of Search .................... 60/639, 495, 398; 290/54; 415/5, 7, 916; 417/328, 329

(56) References Cited

U.S. PATENT DOCUMENTS

| | | | | |
|---|---|---|---|---|
| 29,149 A | * | 7/1860 | Durham | 60/495 |
| 212,186 A | * | 2/1879 | Burwell | 415/5 |
| 1,708,807 A | * | 4/1929 | Tatay | 415/5 |
| 2,037,973 A | * | 4/1936 | Grondahl | 60/496 |
| 3,194,008 A | * | 7/1965 | Baumgartner | 60/495 |
| 4,100,743 A | * | 7/1978 | Trumbull et al. | 60/639 |
| 4,201,059 A | * | 5/1980 | Feder | 60/639 |
| 4,440,427 A | * | 4/1984 | Felton | 60/639 |
| 4,538,415 A | * | 9/1985 | Lebecque | 60/639 |
| 5,430,333 A | * | 7/1995 | Binford et al. | 290/54 |
| 5,753,978 A | * | 5/1998 | Lee | 290/54 |
| 6,249,057 B1 | * | 6/2001 | Lehet | 290/54 |
| 6,781,253 B2 | * | 8/2004 | Newman | 290/53 |

\* cited by examiner

Primary Examiner—Sheldon J Richter

(57) ABSTRACT

The invention discloses a portable hydroelectric apparatus which converts the kinetic energy of water caused by gravity into electrical energy. This conversion is accomplished without the presence of a river or stream. A new type of buoyancy motor is disclosed which is formed as a U-tube erected vertically. One leg and the curved portion at the bottom are filled with a series of separate air-filled tanks. The other leg is filled with water, with a suitable seal at the bottom of the leg through which are made to jut 1½ tanks so the seal prevents water from leaking downward into the air space of the curved portion of the U-tube. Suitable means prevent the water column in the one leg from pushing the series of tanks out of the U-tube. The leading as well as the succeeding tanks behind it are made buoyant in sequence. In rising through the water-filled leg of the U-tube water is pushed through a nozzle which is made to operate hydroelectric devices. Provision is made to recycle both the water and air-filled tanks.

11 Claims, 4 Drawing Sheets

US 6,817,180 B2

GRAVITY AS A SOURCE OF RENEWABLE ENERGY

BACKGROUND OF THE INVENTION

1. Field of the Invention

This invention concerns a hydroelectric apparatus to convert kinetic energy caused by gravity into electrical energy. More particularly it utilizes improvements in buoyancy motors.

2. Description of the Prior Art

Up to now hydroelectric dams have been the main way to convert kinetic energy caused by gravity into electrical energy. These dams are located within the water cycle of the atmosphere. In FIG. 1 we see a diagram of this natural cycle. Water vapor in a cloud above a mountain is made to condense and drop rain on a mountain slope. The water is formed into a river which runs downhill to the sea. On this river is mounted a turbine which is made to revolve by the kinetic energy of the flowing river, caused by gravity. Revolving the turbine and connected electric generator converts energy from the water cycle into electrical energy. The river water is then exhausted into the sea where solar energy causes it to be vaporized. This vaporized water is buoyant in the atmosphere and rises from the sea where it is formed into a cloud of water vapor. Wind causes this cloud to move over the mountain and the water cycle is repeated. It is theoretically possible to convert energy at any point in the cycle into electrical energy but the main way now is through the use of a hydroelectric facility.

Buoyancy is due to gravity. That is, if we change our frame of reference and consider a particle of water vapor in the water cycle as stationary we may consider the atmosphere around it falls until an equality of weight density is reached. Or we may say that the buoyant particle "falls upward". So then we may consider that an object may be made to "fall" upwards and downwards by gravity.

In U.S. Pat. No. #29,149 (Durham) an upright endless chain of buckets is arranged within a suitable box which is filled with water to a suitable level and to which steam or other gas at a pressure greater than the atmosphere is introduced by a pipe or pipes in such a manner as to enter the buckets below the surface of the water and to displace the water therefrom and to give motion to the chain of buckets by its tendency to rise to the surface of the water.

Here, heat energy rather than kinetic energy caused by gravity is made to be converted into mechanical and perhaps electrical energy. The agency is the bucket which its made to "fall upward". In the art endless chain arrangements are unable to function for any length of time by gravity/buoyancy alone but only with an external source of energy, as Durham provided in 1860. Reference is also made herewith to my DD524337 of Jan. 14, 2003.

SUMMARY OF THE INVENTION

In accordance with the invention there is provided a U-shaped tube. This U-tube is placed in a vertical position and one leg is longer than the other. The shorter leg, the curved bottom portion and some of the longer leg are filled with specially shaped tanks which are filled with air. All the tanks are so placed as to press against each other in succession. The tanks are made to roll on ball bearings mounted on the wall of the U-tube. Also affixed to the wall of the U-tube is a circumferential rubber ring located not far below the leading tank's bottom surface. Above the rubber ring the longer leg of the U-tube is filled with water. The shorter leg, curved bottom portion and that part of the longer leg below the rubber ring are filled with air. Thus the rubber ring is a seal preventing water from leaking down into the air filled portions of the U-tube. A hydraulic brake arrangement is provided to keep the pressure of the water column in the longer leg from pushing the train of tanks in the U-tube out of the U-tube. There is provided a pipe as large in cross-section as a leg of the U-tube and located parallel and close to the water-filled leg of the U-tube. This pipe is connected to the water-filled leg and is itself water-filled so water may pass from this leg to the pipe and vice versa. The top of the water-filled leg is closed off except for a nozzle arranged so water passing through it will drive a water turbine and connected D.C. generator as the leading tank is made to rise in the longer water-filled leg of the U-tube, creating pressure and forcing water through a nozzle. Provisions are made to restrain and release the leading tank suitably and to transfer the leading tank to the top of the shorter leg of the U-tube after it has risen to the surface of the longer leg and repeat a cycle of travel.

It is the principal object of the invention to provide a way to convert kinetic energy caused by gravity into electrical energy so as to be portable and not dependant on the location of rivers and streams.

The attainment of the foregoing and related objects, advantages and features of the invention should be more readily apparent to those skilled in the art after review of the following more detailed description of the invention taken together with the drawings in which:

DETAILED DESCRIPTION OF THE PREFERRED MODE

Figure 1:
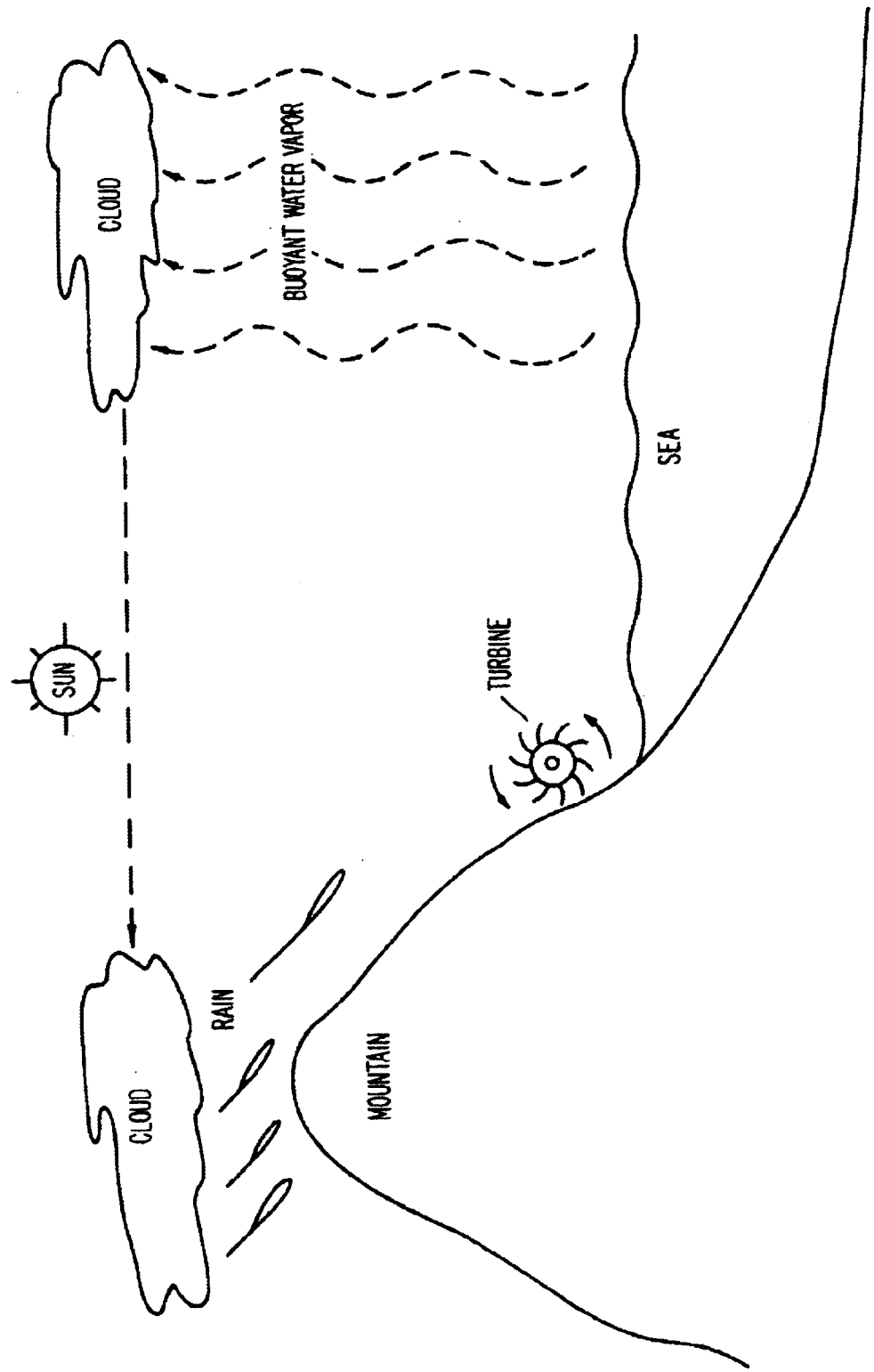
FIG. 1 is a view showing the natural water cycle of the Earth.
Figure 2:
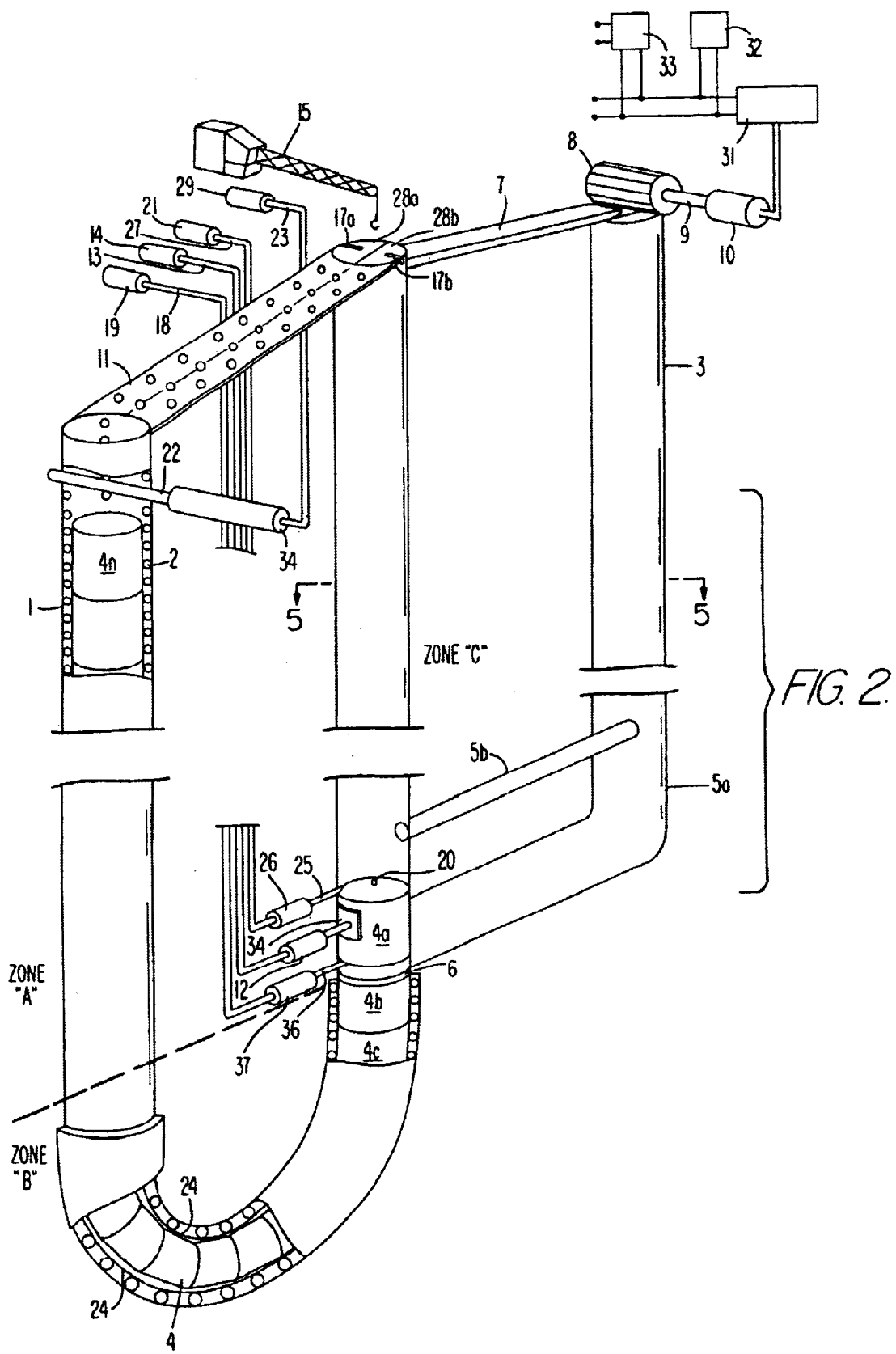
FIG. 2 is a perspective view of the entire invention, but without any supporting structure shown. Only one of several brakes, pistons stops and interconnecting pipes is shown.
Figure 3:
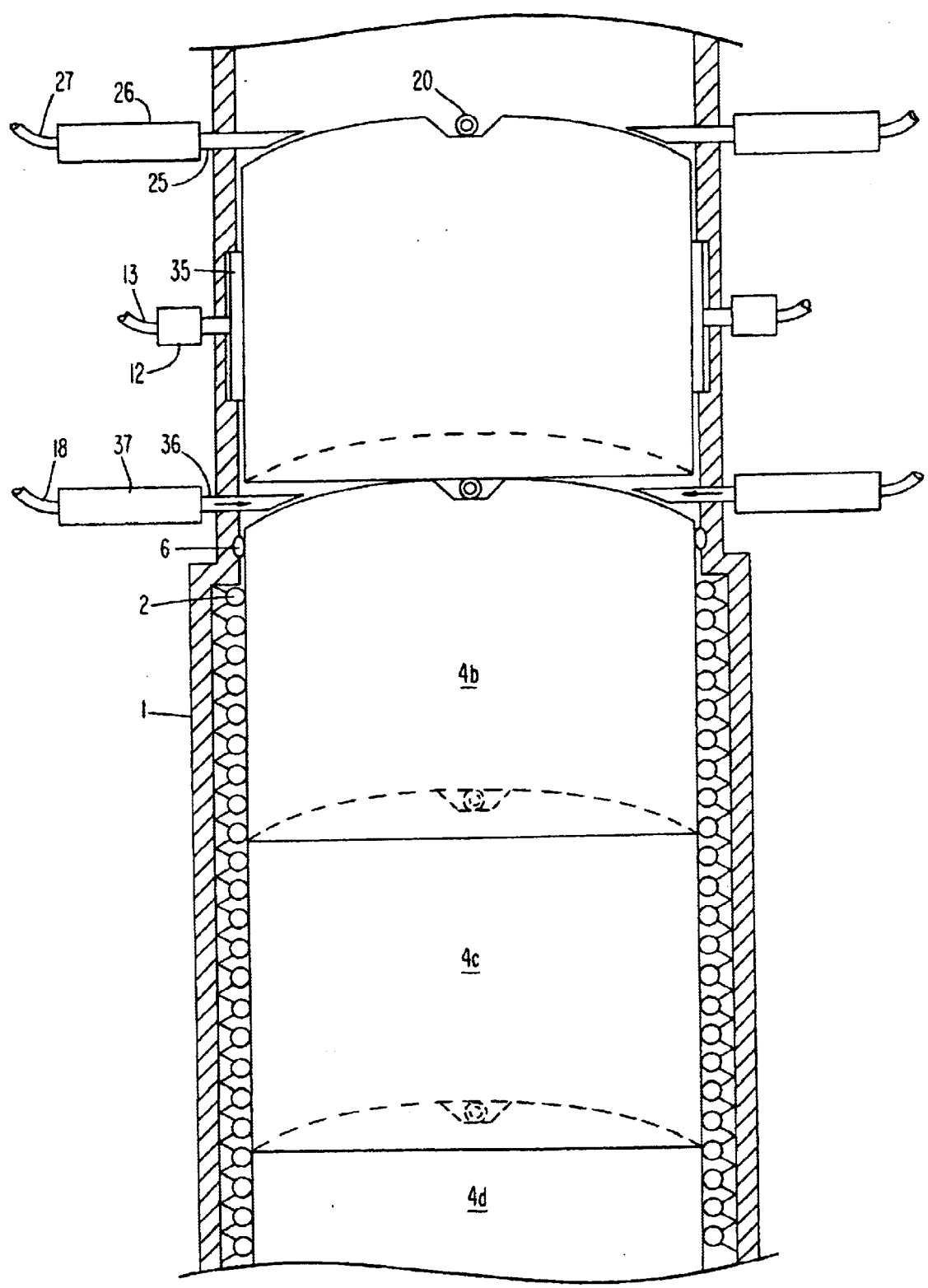
FIG. 3 is a cross-sectional view of the two leading tanks of the invention as the leading tank is about to be released in the cycle of the invention's operation.

Turning to FIG. 2 we see a hollow U-tube 1 with its curved portion down and with one leg longer than the other. The U-tube 1 may be attached to the side of a building or placed underground or in some other convenient location. This U-tube is made with vertical legs and is shown divided into zones A, B and C. Within the U-tube and affixed to its walls are ball bearings 2 which serve as guides to a series of air-filled tanks 4a–n. Conveyor belts 24 in zone B also serves as a tank 4 guide. Parallel to the longer leg of U-tube 1 is another, water-filled tube 3 with interconnecting pipes 5a,b. The leading tank 4a and part of the tank just below it 4b are above a rubber seal 6. Above this seal 6 the longer leg is filled with water. Below seal 6 and also including the curved portion and shorter leg of U-tube 1 is air around the series of tanks 4. Lids 28a,b are connected to the top of zone C by hinges 17a,b. Rubber seat attached to lids 30 to prevent leakage. Pipe 7 is for the passage of water from the top of zone C through a nozzle to operate turbine wheel 8 which is located over tube 3. Shaft 9 connects D.C. generator 10 to turbine wheel 8. Ball bearing lined chute 11 connects the two tops of the legs of U-tube 1. Brake shoe 35 is located to press on therouter surface of tank 4a so as to halt its possible motion. Shoe 35 is operated through slave cylinder 12, hydraulic line 13 and master cylinder 14. Crane 15 is made to operated a cable which has a hook to seize a ring 20 affixed to the top of a tank 4 to tilt it onto chute 11.

Stop 25 is located at a place in zone C where it is desireable to stop and release tank 4a in its travel. It is operated by slave cylinder 26, hydraulic line 27 and master cylinder 21. Bar 22 has a line of travel carrying it across the diameter of U-tube 1 a short distance above tank 4n and is operated by slave cylinder 34, hydraulic line 33 and master cylinder 29. It can be thrown through holes in the wall of U-tube 1 to prevent backward motion of the series of tanks 4 in U-tube 1.

Piston 36 is operated as stop 25, by a slave cylinder 37, hydraulic line 18 and master cylinder 19. It has a face slanted at the same angle as the surface of the convex top of tank 4 it contacts.

Figure 4:
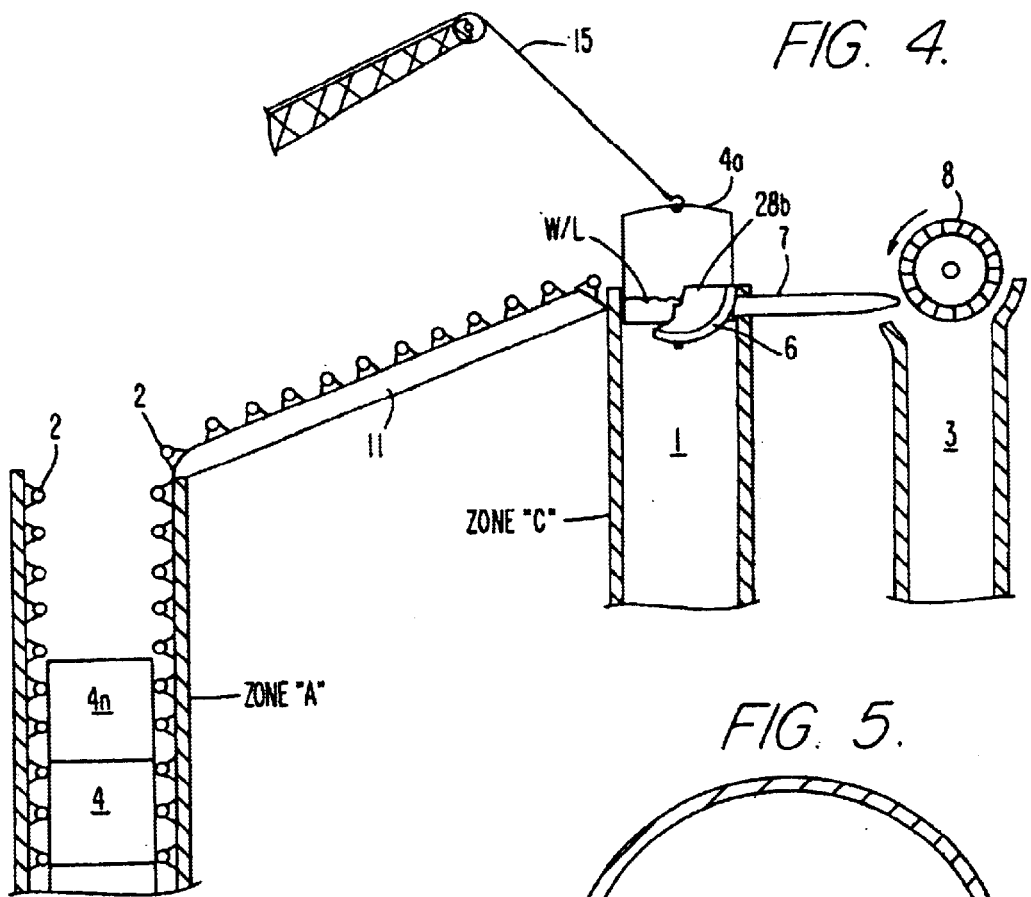
FIG. 4 is a side view showing how a tank is returned to the beginning of its power cycle.
Figure 5:
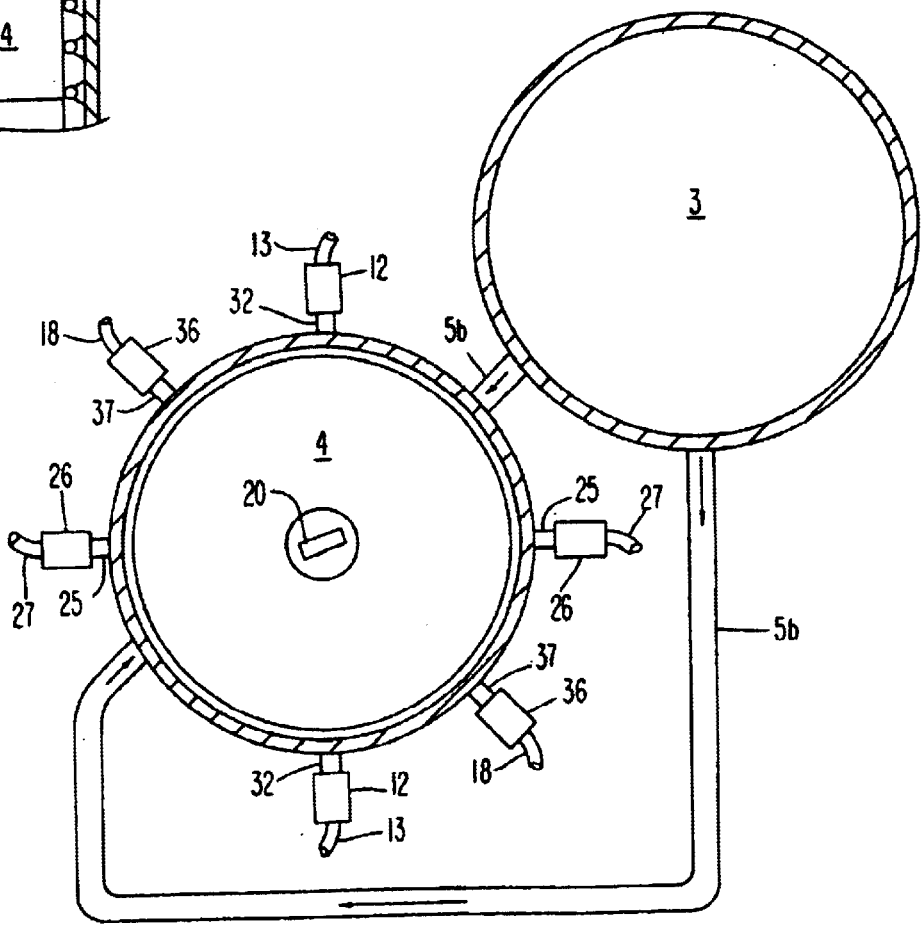
FIG. 5 is a top view of the leading tank, long leg and tube structures.

In FIG. 4 we see how crane 15 and chute 11 are operated, and ball bearings 3 mounted on the wall of U-tube 1. To begin operating the invention we assume U-tube 1 has no tanks 4 or water in it. Referring to FIG. 2 a series of tanks 4a–n are inserted down the shorter leg of the U-tube until leading tank 4a is in the position shown inside the longer leg. Then hydraulic brake 12 (only one is shown) is applied to tank 4a so none of the tanks 4a–n can move forward. Then more tanks 4 are inserted down the shorter leg until the last surface of the last tank is a short distance below the holes for bar 22. Water is then made to fill up the rest of the longer leg above seal 6, and tube 3. The presence of seal 6 prevents the water from leaking into zones A or B.

It should be well noted that stop 25 is not needed at this point to prevent tank 4a from floating to the surface. Since there is no water underneath tank 4a but only on its top and sides there is no buoyant force under tank 4a.

Continuing to describe the operation of the invention: we assume the weight of the water column is greater than the weight of tanks 4a–n. So then,lids 28a,b are closed and latched. Rubber sealing 30 (see FIG. 4) seals the lid to the top of U-tube 1 longer leg. Stop bar 22 is inserted through the holes in the wall of U-tube 1 shorter leg. Piston 36 is pushed forward by the agency of hydraulic arrangement 18, 19, 37, prying the series of tanks 4b–n down. So water is made to rush into the resulting air pocket beneath tank 4a from tube 3 creating a buoyant force. The water in the pocket being pressurized forces tanks 4b–n back until stopped by stop bar 22, a short distance. Then stop 25 and brake 12 are released and tank 4a rises. It should be noted that the no-load velocity of water through pipe 7 at any depth is calculated using Toricelli's theorem:

$$v=\sqrt{2gh},$$

Since the circumference of tanks 4 is fitted like a piston to the circumference of the longer leg which acts as a piston sleeve water in the longer leg is pushed through the nozzle of pipe 7, operating turbine 8 and D.C. generator 10. The exhausted water then drops to fill tube 3 and is made to recirculate to the longer leg of U-tube 1 through pipes 5a,b below the rising tank 4a. This causes a lift force on tank 4b. Also ther is pressure on tank 4b from the tanks 4c–n. As a result if brake 12, 35 is released and stop 36 withdrawn tank 4b will rise. A length of over 33 ft. is recommended for the travel distance of the rising tank 4a.

Operating stop 25 then stops ,tank 4b rise at the former position of tank 4a so as to become a new tank 4a. Brake 12 is then reapplied and stop 36 reinserted but not so much as to pry a gap between the new leading tank 4a and the new tank 4b below it. This reapplication is done before the first leading tank 4a reaches the level of lids 28a,b, when the decreasing current in the longer leg will halt. When tank 4a reaches the lids 28a,b the lids are made to open by a suitable mechanism and the tank pops up to float on the surface of the water in the longer leg. See FIG.4. The floating tank 4a is then tilted onto chute 11 by the action of crane 15. The tank is laid upon chute 11 so its top is nearer to the top of the shorter leg of U-tube 1. The crane hook is then separated from tank 4a which is then free to coast down chute 11 and into the opening at the top of the shorter leg. Lids 28a,b are then closed and latched and the cycle repeated.

Generator 10 is made to operate D.C. voltage regulator 31, battery 32 and A.C. inverter 33 arranged in a manner well known to those skilled in the art to supply both A.C. and D.C. loads. So we see that a tank 4 is made to "fall" throughout a cycle and a large portion of its kinetic energy be converted into electrical energy.

From the above description it is apparent that the preferred mode achieves the principal and related objects of the invention. Alternative modes and various modifications of the mode depicted will be apparent from the above description to those skilled in the art. These and other alternatives are considered to be equivalent and within the spirit and scope of the present invention.

What is claimed is:

1. An energy conversion appratus comprising a buoyancy motor in combination with an eletricity producing device, said buoyancy motor further comprising:

a. a U-tube erected vertically with its semicircular portion downward with one leg longer than the other leg, b. a series of identical air-filled tanks inserted in said U-tube, c. a suitable friction-reducing means so said series of tanks may be made to move easily through said U-tube, d. a suitable means for preventing forward movement of said series of tanks, e. a suitable means for preventing backward movement of said series of tanks, f. water in said longer leg of said U-tube and sealing means to prevent said water from leaking into a said portion of said U-tube filled with air, g. interconnecting means between the tops of the said legs shaped to receive said tank for the purpose of transporting said tank from said leg containing water to the mouth of said other leg of said U-tube, h. covering means fitted to the top of said leg containing water, i. a suitable means to create a buoyant force for a said tank, j. craning means to tilt a said tank at the top of its travel, k. circulating means to circulate water from above a first said tank possessing a buoyant force to a place below said first said tank and atop a next said tank in said series, and said electricity producing device further comprising:

l. a nozzle located so as a said tank with buoyant force is made to rise in said water-filled leg said water is forced through said nozzle, m. a water turbine operated by said water forced through said nozzle, n. an electric generator operated by said turbine, o. a D.C. voltage regulator operated by said generator so D.C. loads may be operated, p. a storage battery connected to electrical power output terminals of said D.C. voltage regulator, and q. an A.C. inverter connected to electrical power output terminal of said D.C. voltage regulator to operate A.C. loads so in operation a lift force is created to act on said next tank as a preceding tank is made to rise by its acquired buoyancy, operating said turbine and generator, producing electricity, repeatedly.

2. The buoyancy motor of claim 1 wherein said air-filled tank further includes a cylindrical shape with a concave bottom whose curvature equals the curvature of said tank's convex top surface so as a following tank in said series in contact with said tank's bottom surface is made to change its axis of travel the two said surfaces will still be in contact over some of their said surfaces.

3. The buoyancy motor of claim 1 wherein said friction-reducing means further includes ball bearings mounted on the inner surface of those portions of said U-tube not containing water, and conveying means comprising a conveyor belt mounted on the inner upper and lower surfaces of the curved portion of said U-tube.

4. The buoyancy motor of claim 1 wherein said suitable means for preventing forward movement of said series of tanks further includes a device selected from the group of a hydraulically operated stop means and a hydraulically operated piston means.

5. The buoyancy motor of claim 1 wherein said means for preventing backward movement of said series of tanks further includes a device selected from the group of a hydraulically operated brake applied to the side wall of a said tank and a hydraulically operated bar thrust across the rear of said series of said tanks.

6. The buoyancy motor of claim 1 wherein said sealing means is a rubber ring fixedly attached to the inner wall of said U-tube.

7. The buoyancy motor of claim 1 wherein said interconnecting means further includes a chuting means lined with ball bearings so said tank may be rolled from the top of said higher, water-filled leg and inserted into the top of said other leg by gravity.

8. The buoyancy motor of claim 1 wherein said covering means further includes:

a. two semicircular lids to cover a circular top of said longer U-tube leg, b. sealing means to seal the edges of said lids to the mouth of said leg of said U-tube, c. latching means to lock and unlock said lids, and d. hingeing means for each said lid.

9. The buoyancy motor of claim 1 wherein said craneing means further includes:

a. a crane, b. a cable, and c. a hooking means at the end of said cable to hook a ring or fixedly attached to the top surface of a said tank.

10. The buoyancy motor of claim 1 wherein said suitable means for creating a buoyant force further includes a hydraulically operated piston located at the outer edge of the division between the concave bottom surface of a first tank and the convex top surface of a succeeding tank and so shaped so when said piston is inserted into said division a space is pried open between said top and bottom surfaces allowing water to flow between them and create a buoyant force on said concave surface 11. The buoyancy motor of claim 1 wherein said circulating means further includes a tube next to and parallel with said longer leg of said U-tube, said tube's open top being located directly below said turbine so said turbine's exhaust water falls into said tube, and pipe means between the bottom of said tube and the water within said longer leg so water may be made to circulate from said turbine to beneath said leading tank.

\* \* \* \* \*